(12) United States Patent
Westfall, II

(10) Patent No.: US 9,638,224 B1
(45) Date of Patent: May 2, 2017

(54) WEIGHT-ACTUATED PANEL HOLDER AND HOLDER ASSEMBLY INCLUDING THE SAME

(71) Applicant: Donald Bruce Westfall, II, Granville, OH (US)

(72) Inventor: Donald Bruce Westfall, II, Granville, OH (US)

( * ) Notice: Subject to any disclaimer, the term of this patent is extended or adjusted under 35 U.S.C. 154(b) by 0 days.

(21) Appl. No.: 14/868,092

(22) Filed: Sep. 28, 2015

(51) Int. Cl.
| | |
|---|---|
| B25B 5/00 | (2006.01) |
| F16B 2/10 | (2006.01) |
| F16M 11/04 | (2006.01) |
| F16B 2/00 | (2006.01) |
| F16B 2/18 | (2006.01) |

(52) U.S. Cl.
CPC ............. *F16B 2/10* (2013.01); *F16B 2/005* (2013.01); *F16B 2/18* (2013.01); *F16B 2/185* (2013.01); *F16M 11/04* (2013.01)

(58) Field of Classification Search
CPC .. B25B 11/00; B25B 5/06; B25B 5/14; B25B 5/04; B25B 5/08; B25B 5/142; B25B 5/145; B25B 5/00; B25B 5/003; B25B 5/061; B25B 5/10; B25B 5/16; B25B 11/005; B25B 11/02; B25B 1/103; B25B 1/20
USPC ... 248/229.1, 229.11, 229.15, 226.11, 228.1, 248/228.2, 228.6, 313, 316.3, 316.1, 248/316.7, 316.8; 269/86, 133
See application file for complete search history.

(56) References Cited

U.S. PATENT DOCUMENTS

| | | | |
|---|---|---|---|
| 342,187 A | 5/1886 | Cornell | |
| 1,161,983 A | 11/1915 | Schultz | |
| 1,715,722 A | 6/1929 | Smith et al. | |
| 2,971,548 A | 2/1961 | House | |
| 4,054,281 A | 10/1977 | Martinsson | |
| 4,168,827 A | 9/1979 | Hutchinson | |
| 5,544,396 A * | 8/1996 | Mekyska | A47L 13/512 24/523 |
| 6,056,282 A | 5/2000 | Desmarais | |
| 6,290,227 B1 | 9/2001 | Reist | |
| 6,637,082 B1 * | 10/2003 | Chang | F16B 2/10 24/489 |
| 6,663,123 B1 * | 12/2003 | Kovacs | B62B 1/142 269/133 |
| 7,806,394 B2 | 10/2010 | Wuerthner | |
| 7,938,829 B2 * | 5/2011 | Mullaney | A61B 17/645 403/385 |
| 8,720,841 B2 * | 5/2014 | Morren | F16B 2/10 248/229.2 |
| 8,757,604 B2 | 6/2014 | Crampton | |
| 2014/0319751 A1 * | 10/2014 | Chen | B25B 11/00 269/133 |

* cited by examiner

*Primary Examiner* — Steven Marsh
(74) *Attorney, Agent, or Firm* — The Law Office of Patrick F. O'Reilly III, LLC

(57) ABSTRACT

A weight-actuated panel holder is disclosed herein. The weight-actuated panel holder includes a first jaw member; a second jaw member pivotally coupled to the first jaw member, the first and second jaw members cooperating to a form a slot for receiving an end portion of a panel, an opening width of at least a portion of the slot being configured to be reduced when a weight of the panel actuates the first and second jaw members towards a closed position; and a clutch mechanism coupled to at least one of the first and second jaw members, the clutch mechanism configured to bias at least one of the first and second jaw members in the closed position.

20 Claims, 8 Drawing Sheets

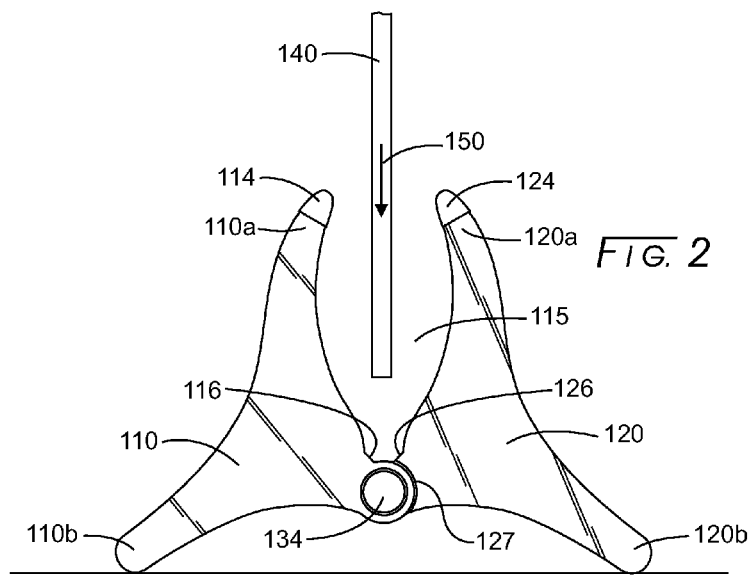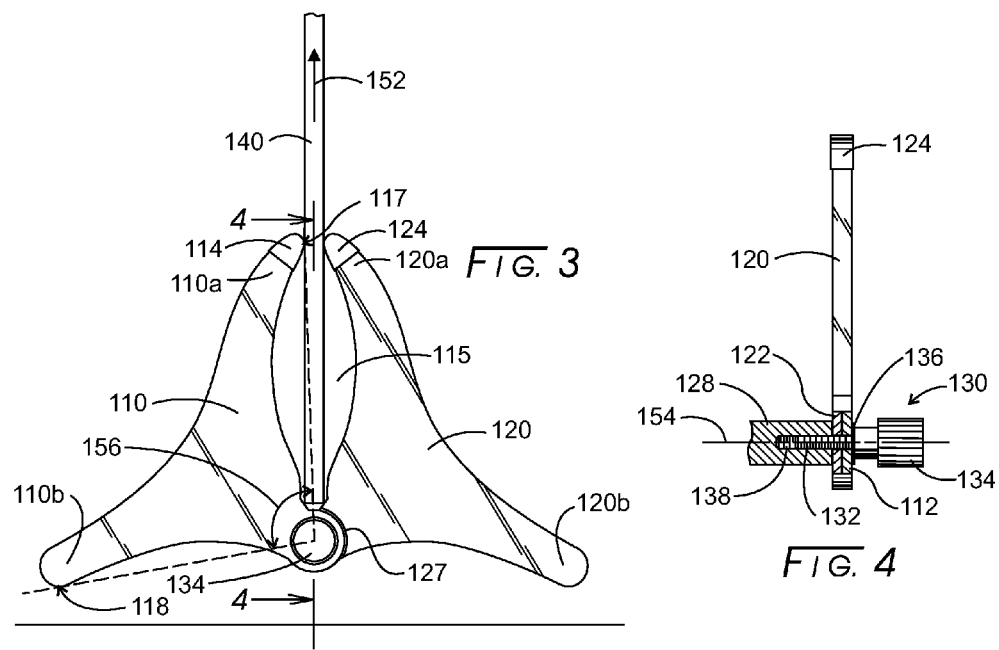

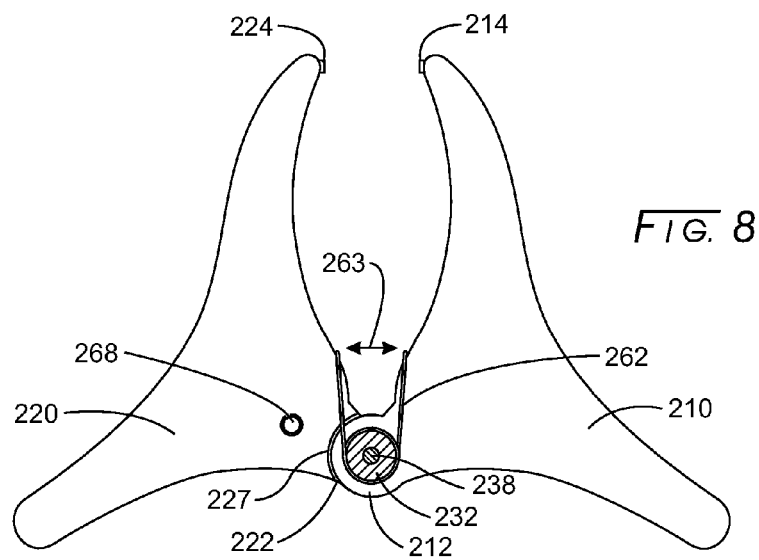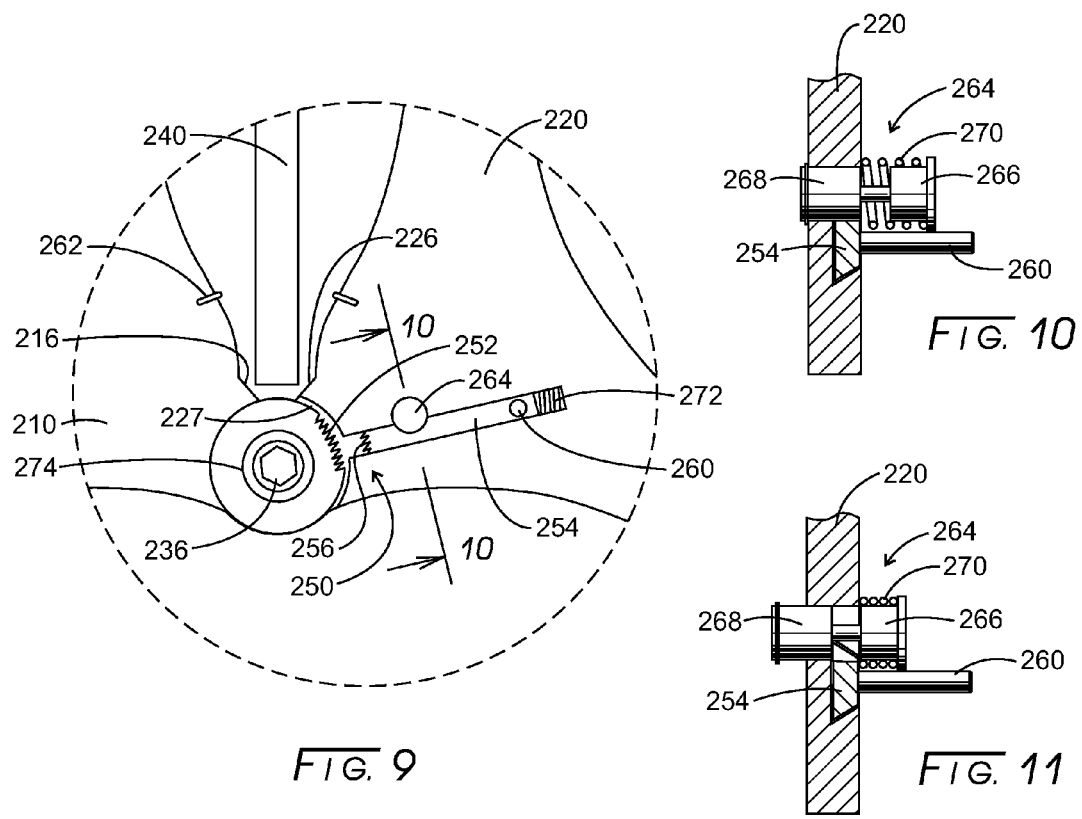

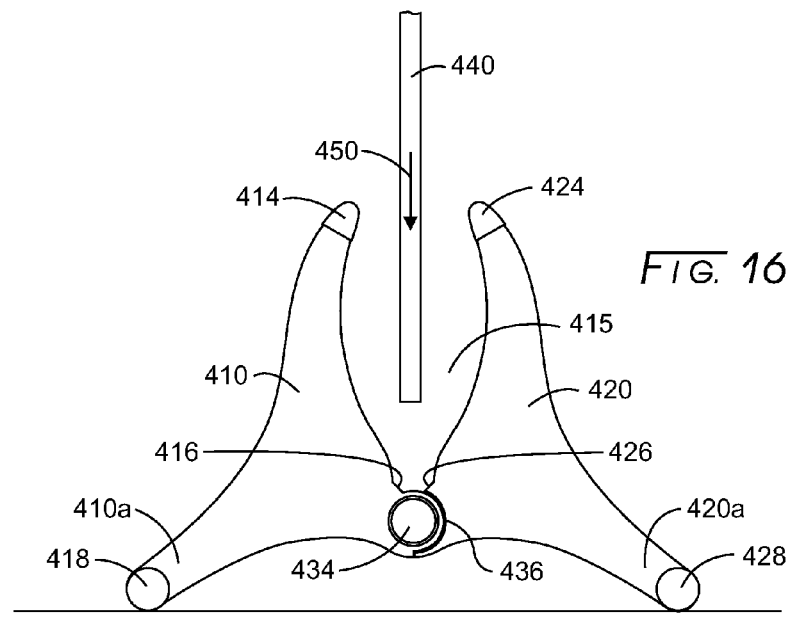
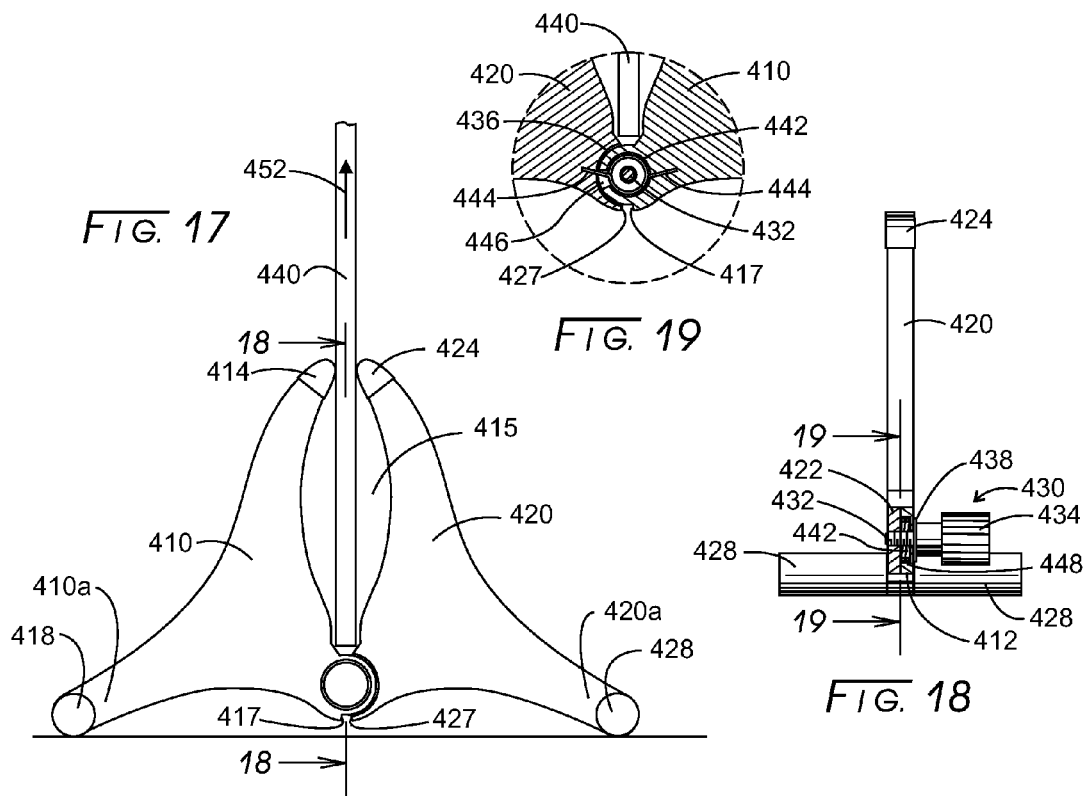

WEIGHT-ACTUATED PANEL HOLDER AND HOLDER ASSEMBLY INCLUDING THE SAME

CROSS-REFERENCE TO RELATED APPLICATIONS

Not Applicable.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISK

Not Applicable.

BACKGROUND OF THE INVENTION

1. Field of the Invention

The invention generally relates to weight-actuated panel holders and holder assemblies including the same. More particularly, the invention relates to weight-actuated panel holders and holder assemblies that are used for holding a panel in an upright position.

2. Background and Description of Related Art

When displaying a sign on a horizontal surface, such as a tabletop, stands are often used to maintain the sign in an upright position. Similarly, stands are also used to hold planar workpieces in upright positions when work is being performed thereon (e.g., when a wall panel is being sanded or painted). However, conventional stands that are designed for holding panels in vertical or upright positions have numerous limitations and drawbacks. First of all, many of these conventional stands require that tools be used to secure the sign or panel to the stand itself. Secondly, conventional stands typically require readjustment if a user wants to relocate the sign or panel that is being held by the stand (e.g., the sign or panel typically has to be reattached to the stand). Thirdly, conventional stands are typically not scalable for accommodating a variety of different panel sizes. Finally, conventional stands often require the user to manually center the panel within the stand in order for the panel to be disposed in a straight vertical position.

Therefore, what is needed is a weight-actuated panel holder and a holder assembly including the same that allows a panel to be quickly and easily supported in a vertical or upright position without requiring the use of tools. Moreover, a weight-actuated panel holder is needed that does not require any readjustment when the sign or panel that is being held thereby is moved to another location by a user. Furthermore, there is a need for a weight-actuated panel holder that is capable of accommodating a variety of different panel sizes. In addition, a weight-actuated panel holder is needed that does not require a user to manually center the panel when it is initially being inserted into the stand.

BRIEF SUMMARY OF EMBODIMENTS OF THE INVENTION

Accordingly, the present invention is directed to a weight-actuated panel holder and a holder assembly including the same that substantially obviates one or more problems resulting from the limitations and deficiencies of the related art.

In accordance with one or more embodiments of the present invention, there is provided a weight-actuated panel holder that includes a first jaw member; a second jaw member pivotally coupled to the first jaw member, the first and second jaw members cooperating to a form a slot for receiving an end portion of a panel, an opening width of at least a portion of the slot being configured to be reduced when a weight of the panel actuates the first and second jaw members towards a closed position; and a clutch mechanism coupled to at least one of the first and second jaw members, the clutch mechanism configured to bias at least one of the first and second jaw members in the closed position.

In a further embodiment of the present invention, at least one of the first and second jaw members is generally transparent to visible light.

In yet a further embodiment, the first jaw member comprises a first tip portion and the second jaw member comprises a second tip portion, at least one of the first and second tip portions comprising a tip cover disposed thereon, the tip cover configured to increase a frictional contact between the panel and the at least one of the first and second tip portions so as to retain the panel within the weight-actuated panel holder when the panel is lifted from a surface on which it rests, and the tip cover further configured to protect a surface of the panel from damage by the at least one of the first and second tip portions.

In still a further embodiment, the clutch mechanism comprises a threaded rod portion and a knob portion attached to one end of the threaded rod portion, the clutch mechanism configured to bias the at least one of the first and second jaw members in the closed position when the knob portion is tightened against a side of one of the first and second jaw members.

In yet a further embodiment, the clutch mechanism comprises a ratchet mechanism, the ratchet mechanism including a toothed sector disposed on one of the first and second jaw members, the ratchet mechanism further including a pawl member received within a cavity or slot in the other one of the first and second jaw members, the pawl member including one or more teeth disposed at one end thereof that are configured to matingly engage with one or more teeth of the toothed sector of the ratchet mechanism so as to enable the opening width of the slot to be incrementally adjustable, and the at least one of the first and second jaw members to be biased in the closed position.

In still a further embodiment, the weight-actuated panel holder further comprises a pawl locking mechanism, the pawl locking mechanism configured to selectively retain the pawl member in a retracted position whereby the one or more teeth at the one end of the pawl member are disengaged from the one or more teeth of the toothed sector so that the panel is capable of being more easily removed from the slot defined by the first and second jaw members.

In yet a further embodiment, the clutch mechanism comprises a cam-operated clutch mechanism, the cam-operated clutch mechanism comprising a lever member that is pivotable about a rotational axis, the lever member having a tapered inner surface, the cam-operated clutch mechanism configured to bias the at least one of the first and second jaw members in the closed position when the tapered inner surface of the lever member is frictionally engaged with a tapered inner surface of one of the first and second jaw members.

In still a further embodiment, the lever member of the cam-operated clutch mechanism comprises one or more finger tabs extending outwardly therefrom, the one or more finger tabs configured to facilitate a grasping of the lever member by the user thereof.

In yet a further embodiment, the weight-actuated panel holder further comprises a spring member configured to bias at least one of the first and second jaw members in an open position so that the end portion of the panel is capable of being more easily inserted into the slot defined by the first and second jaw members.

In still a further embodiment, the spring member is externally disposed on the first and second jaw members.

In yet a further embodiment, at least one of the first and second jaw members comprises a spring cavity formed therein, the spring member being internally disposed within the spring cavity.

In still a further embodiment, at least one of the first and second jaw members comprises a rotation limiting stop portion, the rotation limiting stop portion configured to prevent the first and second jaw members from being opened beyond a maximum angular displacement position.

In yet a further embodiment, the first jaw member comprises a first base portion and the second jaw member comprises a second base portion, each of the first and second base portions comprising a respective foot portion attached thereto, the respective feet portions configured to stabilize the weight-actuated panel holder in an upright position.

In accordance with one or more other embodiments of the present invention, there is provided a weight-actuated panel holder assembly that comprises a plurality of panel holder devices, each of the plurality of panel holder devices including (i) a first jaw member; and (ii) a second jaw member pivotally coupled to the first jaw member, the first and second jaw members cooperating to a form a slot for receiving an end portion of a panel, an opening width of at least a portion of the slot being configured to be reduced when a weight of the panel actuates the first and second jaw members towards a closed position; at least one clutch mechanism coupled to at least one of the first and second jaw members of at least one of the plurality of panel holder devices, the clutch mechanism configured to bias at least one of the first and second jaw members in the closed position; and an elongate connector device connecting a first of the plurality of panel holder devices to a second of the plurality of panel holder devices.

In a further embodiment of the present invention, the elongate connector device is in the form of a rod member having a fixed length.

In yet a further embodiment, the elongate connector device comprises an inner elongate member telescopically received within an outer elongate member, wherein a longitudinal distance between the first of the plurality of panel holder devices and the second of the plurality of panel holder devices is configured to be adjusted by displacing the inner elongate member relative to the outer elongate member so that the weight-actuated panel holder assembly is capable of accommodating panels of varying widths.

In still a further embodiment, the elongate connector device further comprises a locking collar configured to fix a position of the inner elongate member relative to the outer elongate member so that the longitudinal distance between the first of the plurality of panel holder devices and the second of the plurality of panel holder remains substantially constant.

In accordance with yet one or more other embodiments of the present invention, there is provided a weight-actuated panel holder that includes a first jaw member; a second jaw member pivotally coupled to the first jaw member about a rotational axis, the first and second jaw members cooperating to a form a slot for receiving an end portion of a panel, an opening width of at least a portion of the slot being configured to be reduced when a weight of the panel actuates the first and second jaw members towards a closed position; a spring member configured to bias at least one of the first and second jaw members in an open position so that the end portion of the panel is capable of being more easily inserted into the slot defined by the first and second jaw members; and a clutch mechanism coupled to at least one of the first and second jaw members, the clutch mechanism configured to bias at least one of the first and second jaw members in the closed position.

In a further embodiment of the present invention, the spring member at least partially circumscribes the rotational axis of the first and second jaw members.

In yet a further embodiment, each of the first and second jaw members comprises a tip portion with a tip contact surface and a foot portion with a foot contact surface, the tip contact surface of the tip portion being disposed at an obtuse angle relative to the foot contact surface of the foot portion.

It is to be understood that the foregoing general description and the following detailed description of the present invention are merely exemplary and explanatory in nature. As such, the foregoing general description and the following detailed description of the invention should not be construed to limit the scope of the appended claims in any sense.

BRIEF DESCRIPTION OF THE SEVERAL VIEWS OF THE DRAWINGS

The invention will now be described, by way of example, with reference to the accompanying drawings, in which:

FIG. 2 is an end view of the weight-actuated panel holder assembly of FIG. 1, wherein the holder assembly is illustrated in its open position, and wherein the panel is shown being inserted into the holder assembly;

FIG. 3 is another end view of the weight-actuated panel holder assembly of FIG. 1, wherein the holder assembly is illustrated in its closed position, and wherein the panel is shown being lifted together with the holder assembly;

FIG. 4 is a partial sectional view of the weight-actuated panel holder assembly of FIG. 1, wherein the section is cut along the cutting-plane line 4-4 in FIG. 3;

FIG. 8 is a side view of one of the weight-actuated panel holders of the weight-actuated panel holder assembly of FIG. 5, wherein a spring member of the weight-actuated panel holder is illustrated;

FIG. 9 is a partial, enlarged detail view of the ratchet mechanism of the weight-actuated panel holder assembly of FIG. 7, wherein the ratchet mechanism is shown in its disengaged position;

FIG. 10 is a partial sectional view of the weight-actuated panel holder of FIG. 9, wherein a pawl member of the ratchet mechanism is shown in its locked position, and wherein the section is cut along the cutting-plane line 10-10 in FIG. 9;

FIG. 11 is another partial sectional view of the weight-actuated panel holder of FIG. 9, which is similar to FIG. 10, except that the pawl member of the ratchet mechanism is shown in its unlocked position.

FIG. 16 is an end view of one of the weight-actuated panel holders of FIG. 15, wherein the panel holder is illustrated in its open position, and wherein the panel is shown being inserted into the panel holder;

FIG. 17 is another end view of the weight-actuated panel holder of FIG. 16, wherein the panel holder is illustrated in its closed position;

FIG. 18 is a partial sectional view of the weight-actuated panel holder of FIGS. 16 and 17, wherein the section is cut along the cutting-plane line 18-18 in FIG. 17; and FIG. 19 is a partial sectional view of the weight-actuated panel holder of FIGS. 16 and 17, wherein the section is cut transversely through the panel holder along cutting-plane line 19-19 of FIG. 18 in order to illustrate the spring cavity disposed therein.

Throughout the figures, the same parts are always denoted using the same reference characters so that, as a general rule, they will only be described once.

DETAILED DESCRIPTION OF EMBODIMENTS OF THE INVENTION

Figure 1:
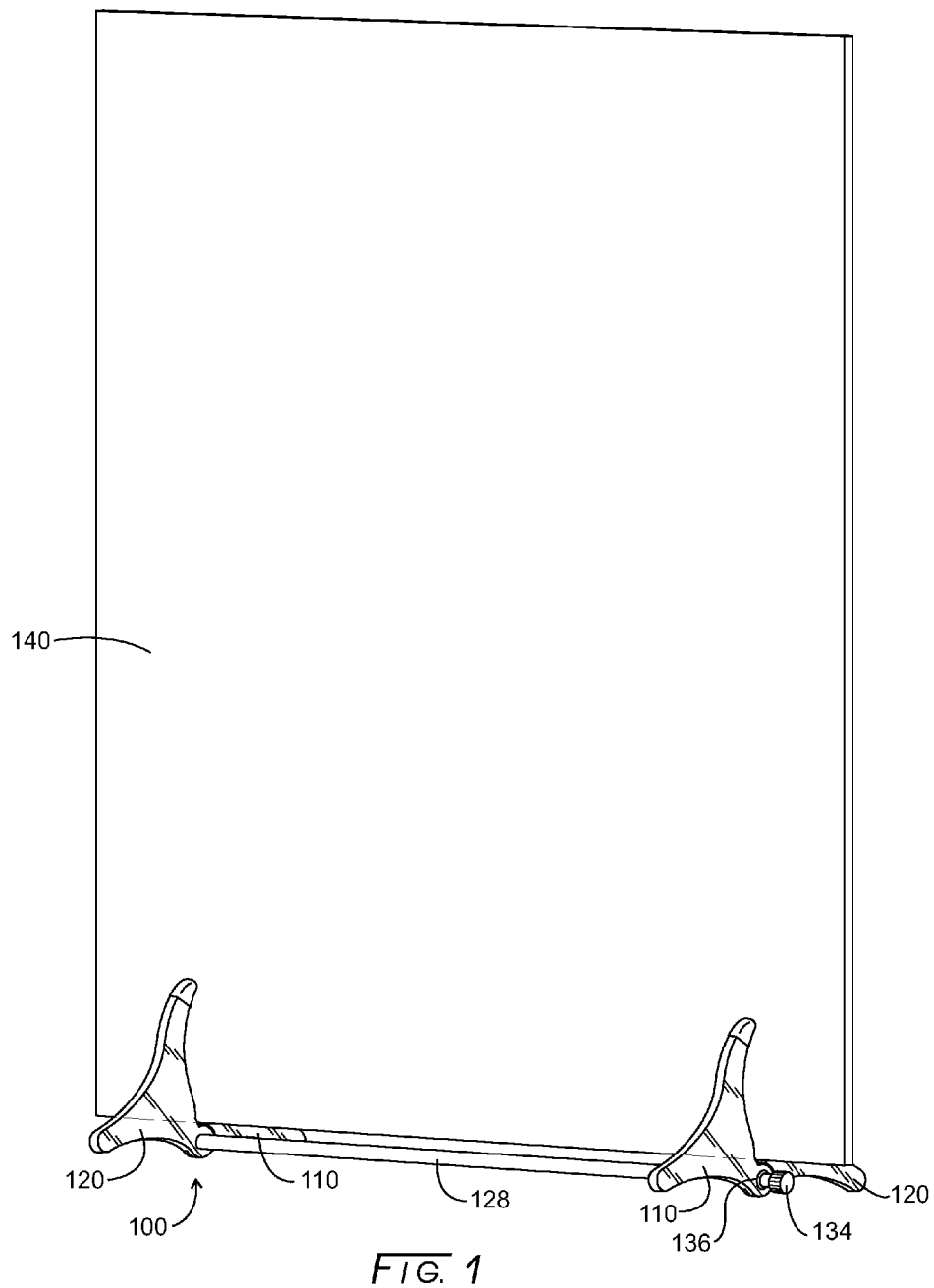
FIG. 1 is a perspective view of a weight-actuated panel holder assembly with a panel supported therein, according to a first embodiment of the invention.

A first embodiment of a weight-actuated panel holder assembly is seen generally at 100 in FIGS. 1-4. In the first illustrative embodiment, the weight-actuated panel holder assembly 100 comprises a plurality of panel holder devices (e.g., a pair of panel holder devices) that are connected to one another by means of an elongate connector device. In the first embodiment, the elongate connector device is in the form of a fixed-length connector rod 128 that is non-adjustable in length. As shown in FIG. 1, the connector rod 128 connects a first one of the pair of panel holder devices to a second one of the pair of panel holder devices. Turning to FIGS. 2 and 3, it can be seen that each of the panel holder devices generally includes a first jaw member 110, a second jaw member 120 pivotally coupled to the first jaw member 110, the first and second jaw members 110, 120 cooperating to a form a slot 115 for receiving an end portion of a panel 140; and at least one clutch mechanism 130 (or biasing mechanism—see FIG. 4) coupled to the first and second jaw members 110, 120 of the panel holder device, the clutch mechanism 130 configured to bias the first and second jaw members 110, 120 in a closed position. As shown in FIGS. 2 and 3, when a panel 140 is inserted into the weight-actuated panel holder assembly 100 (as diagrammatically represented by the insertion directional arrow 150 in FIG. 2), an opening width of the slot 115 is reduced by a weight of the panel 140 actuating the first and second jaw members 110, 120 from the open position of FIG. 2 to the closed position of FIG. 3 (i.e., the weight of the panel 140 applies a downward vertical force against the top of the pivotal hinge between the first and second jaw members 110, 120, which in turn, results in the respective tip portions 110a, 120a of the first and second jaw members 110, 120 rotating towards one another until the panel holder devices of the weight-actuated panel holder assembly 100 are in the closed position illustrated in FIG. 3).

Now, with reference primarily to FIGS. 2 and 3, it can be seen that, in the illustrative embodiment, the first jaw member 110 comprises a tip portion 110a and a foot portion 110b. Similarly, the second jaw member 120 comprises a tip portion 120a and a foot portion 120b. As shown in FIG. 3, the tip portion 110a of the first jaw member 110 comprises a tip contact surface 117 that is configured to contact the surface of the panel 140, and a foot contact surface 118 that is configured to contact the surface on which the weight-actuated panel holder assembly 100 is disposed (e.g., a floor surface or the top surface of a table, cabinetry, etc.). In the illustrated embodiment, it can be seen that the tip contact surface 117 of the tip portion 110a of the first jaw member 110 is disposed at an obtuse angle 156 relative to the foot contact surface 118 of the foot portion 110b of the first jaw member 110. For example, in an exemplary embodiment, the obtuse angle 156 between the tip contact surface 117 and the foot contact surface 118 may be in the range between approximately 95 degrees and approximately 105 degrees (or between 95 degrees and 105 degrees). More particularly, in an exemplary embodiment, the obtuse angle 156 between the tip contact surface 117 and the foot contact surface 118 may be approximately 98 degrees. In FIGS. 2 and 3, it can be seen that the second jaw member 120 may also be formed with a tip contact surface and a foot contact surface forming approximately the same obtuse angle.

Referring again to FIGS. 2 and 3, it can be seen that the respective tip portions 110a, 120a of the first and second jaw members 110, 120 may be provided with respective tip covers 114, 124 disposed thereon. In an exemplary embodiment, the tip covers 114, 124 may be formed from a suitable rubber material (i.e., which is relatively soft and compressible). Advantageously, the tip covers 114, 124 increase a frictional contact between the panel 140 and a respective one of the first and second tip portions 110a, 120a so as to retain the panel within the weight-actuated panel holder assembly 100 when the panel 140 is lifted from a surface on which it rests (e.g., as shown in FIG. 3). In addition, the tip covers 114, 124 advantageously protect a surface of the panel 140 from damage by the first and second tip portions 110a, 120a of the first and second jaw members 110, 120 (i.e., from being scratched by the tip portions 110a, 120a, etc.). Thus, the surface finish of the panel 140 is protected from damage thereto.

In the illustrative embodiment, as best shown in FIG. 2, the first and second jaw members 110, 120 are provided with respective panel receiving notches 116, 126 formed therein for accommodating the bottom edge portion of the panel 140. As shown in the illustrative embodiment, each of the panel receiving notches 116, 126 may comprise a diagonal surface (e.g., oriented at approximately a 45 degree angle) that is disposed above the pivotal hinge portion of the panel holder device.

Next, with reference to FIGS. 2-4, the pivotal hinge portions of the panel holder devices of the weight-actuated panel holder assembly 100 will be described. As best shown in the sectional view of FIG. 4, in the illustrative embodiment, the first and second jaw members 110, 120 of each panel holder device are provided with respective reduced width portions 112, 122, which overlap one another so as to form an overlapping hinge portion. Each reduced width portion 112, 122 has a width or thickness that is approximately equal to one-half of the width or thickness of the remaining portion of the first and second jaw members 110, 120 so that the hinge portion of each panel holder device has generally the same width or thickness as the remainder of the first and second jaw members 110, 120 (see FIG. 4). A respective hinge recess is formed in the hinge portion of the first and second jaw members 110, 120, which results in the respective reduced width portions 112, 122. In FIGS. 2-4, it can be seen that the hinge recess of first jaw member 110 receives the reduced width portion 122 of the second jaw member 120 therein, while the hinge recess of second jaw member 120 receives the reduced width portion 112 of the first jaw member 110 therein, thereby resulting in a hinge portion that has generally the same width or thickness as the remainder of the first and second jaw members 110, 120. As mentioned above, when a downward vertical force is applied to the top of the pivotal hinge portion, the first and second jaw members 110, 120 rotate about the pivotal axis 154 disposed through the center of the circular apertures in the reduced width portions 112, 122 (see FIG. 4). In order to reduce friction, and thus, to allow the first and second jaw members 110, 120 to more freely rotate relative to one another, a semi-circular clearance gap 127 (refer to FIGS. 2 and 3) is provided between the first and second jaw members 110, 120 at the hinge portion of the panel holder device (e.g., a semi-circular clearance gap 127 is disposed between the semi-circular outer edge of the reduced width portion 112 of the first jaw member 110 and the semi-circular inner wall of the hinge recess of the second jaw member 120).

In the first illustrative embodiment, each of the first and second jaw members 110, 120 is formed from a material that is generally transparent to visible light (i.e., so that one is able to see through each of the first and second jaw members 110, 120). Advantageously, the transparency of the first and second jaw members 110, 120 helps to prevent the weight-actuated panel holder assembly 100 from obscuring any indicia that is printed on the panel 140 being held by the panel holder assembly 100 (e.g., when the panel 140 comprises a sign for advertising or promoting a particular product in a retail store). In an exemplary embodiment, the transparent material that forms the first and second jaw members 110, 120 in the first illustrative embodiment may comprise a clear plastic material or a clear polymeric material (e.g., a clear polycarbonate material or clear polymethyl methacrylate (PMMA)).

Next, referring primarily to FIGS. 1 and 4, the clutch or biasing mechanism 130 of the first illustrative embodiment of the weight-actuated panel holder assembly 100 will be described. As shown in FIG. 4, the clutch or biasing mechanism 130 comprises a threaded rod portion 132 and a knob or handle portion 134 attached to one end of the threaded rod portion 132. When the knob or handle portion 134 is tightened against a side of the reduced width portion 112 of the first jaw member 110 by a user rotating the knob 134 in a first rotational direction (i.e., clockwise), the clutch mechanism 130 biases the first and second jaw members 110, 120 in the closed position such that the panel 140 can be lifted (as diagrammatically indicated by the arrow 152 in FIG. 3) without disengaging the panel 140 from the weight-actuated panel holder assembly 100. In other words, the clutch or biasing mechanism 130 maintains the first and second jaw members 110, 120 in the closed position so that the panel 140 and the weight-actuated panel holder assembly 100 can be lifted up together by a user thereof (e.g., so that the location of the panel 140 can be changed without disengaging the panel holder assembly 100 from the panel 140). In order to loosen the grip of the first and second jaw members 110, 120 on the panel 140, a user rotates the knob 134 in a second rotational direction that is opposite to the first rotational direction (i.e., counter-clockwise). Advantageously, the handle portion 134 of the illustrated embodiment may be tightened or loosened by a user of the weight-actuated panel holder assembly 100 without the use of tools (e.g., no wrenches or screwdrivers are needed for tightening and loosening the handle portion 134). As shown in the illustrated embodiment, the outer peripheral surface of the handle portion 134 may be knurled so as to enhance the grip of a user on knob 134.

Referring again to the sectional view of FIG. 4, it can be seen that, in the first illustrative embodiment, the threaded rod portion 132 of the clutch mechanism 130 is threadingly engaged with an internally-threaded bore 138 that is formed in the end of the connector rod 128. Also, in the illustrative embodiment, a washer 136 is provided between the rear surface of the knob or handle portion 134 of the clutch mechanism 130 and the front surface of the reduced width portion 112 of the first jaw member 110. When the knob or handle portion 134 of the clutch mechanism 130 is tightened, the knob portion 134 of the clutch mechanism 130 compresses the opposed surfaces of the reduced width portions 112, 122 against one another, thereby creating a frictional engagement between the reduced width portions 112, 122 so as to prevent the rotational movement of the first and second jaw members 110, 120 relative to one another. As such, the first and second jaw members 110, 120 of the panel holder device are maintained in gripping contact with the panel 140.

A second illustrative embodiment of the weight-actuated panel holder assembly is seen generally at 200 in FIGS. 5-11. Referring to these figures, it can be seen that, in some respects, the second illustrative embodiment is similar to that of the first embodiment. Moreover, many elements are common to both such embodiments. For the sake of brevity, the elements that the second embodiment of the weight-actuated panel holder assembly 200 has in common with the first embodiment will not be discussed in detail because these components have already been explained in detail above.

Figure 5:
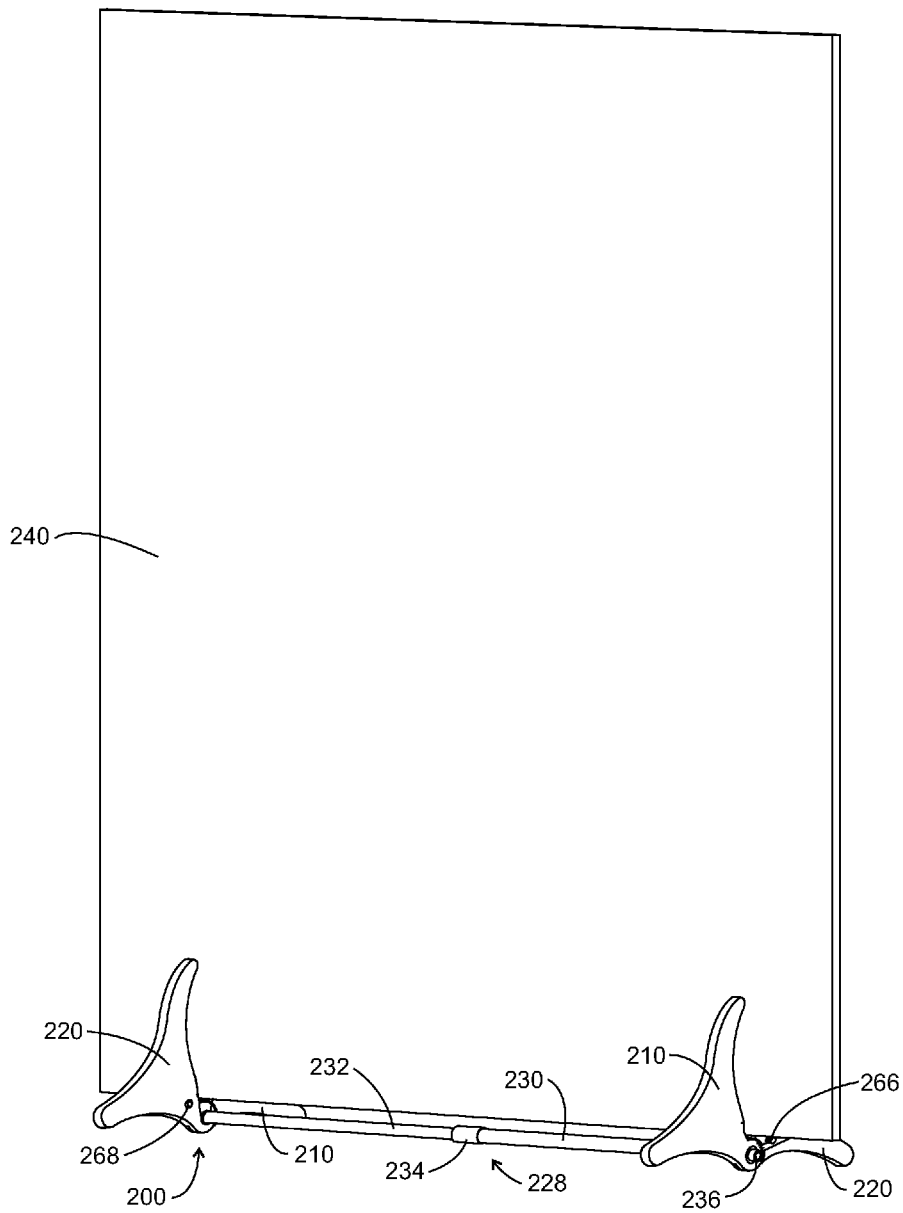
FIG. 5 is a perspective view of a weight-actuated panel holder assembly with a panel supported therein, according to a second embodiment of the invention.

Similar to the first illustrative embodiment described above, the weight-actuated panel holder assembly 200 of the second embodiment comprises a plurality of panel holder devices (e.g., a pair of panel holder devices) that are connected to one another by means of an elongate connector device. However, in the second embodiment, the elongate connector device is in the form of an adjustable length connector rod 228 that is capable of accommodating panels 240 having different widths. In FIG. 5, it can be seen that the adjustable length connector rod 228 connects a first one of the pair of panel holder devices to a second one of the pair of panel holder devices. Also, as shown in FIG. 5, the adjustable length connector rod 228 comprises an inner elongate rod 232 telescopically received within an outer elongate rod 230. The longitudinal distance between a first of the pair of panel holder devices and a second of the pair of panel holder devices is adjusted by axially displacing the inner elongate rod 232 relative to the outer elongate rod 230 so that the weight-actuated panel holder assembly 200 is capable of accommodating panels 240 of varying widths. Referring again to FIG. 5, it can be seen that the adjustable length connector rod 228 further comprises a locking collar 234 configured to fix a position of the inner elongate rod 232 relative to the outer elongate rod 230 so that the longitudinal distance between the first of the pair of panel holder devices and the second of the pair of panel holder devices remains substantially constant. In an exemplary embodiment, the locking collar 234 may fix the axial or longitudinal position of the inner elongate rod 232 by frictionally engaging the outer peripheral surface of the inner elongate rod 232. In the illustrative embodiment, with combined reference to FIGS. 5-7, 8, and 9, it can be seen that each of the panel holder devices is connected to a respective one of the opposed ends of the adjustable length connector rod 228 by means of a connector rod fastener member 236 (e.g., a shoulder bolt or screw 236). More particularly, as shown in FIGS. 5, 8, and 9, an externally threaded shaft portion 238 of each connector rod fastener member 236 is threadingly engaged within an internally threaded bore in a respective one of the outer elongate rod 230 and the inner elongate rod 232. Also, in the illustrative embodiment, a washer 274 is provided between the rear surface of the head of each fastener member 236 and the front surface of the panel holder device (see FIGS. 6, 7, and 9).

Figure 6:
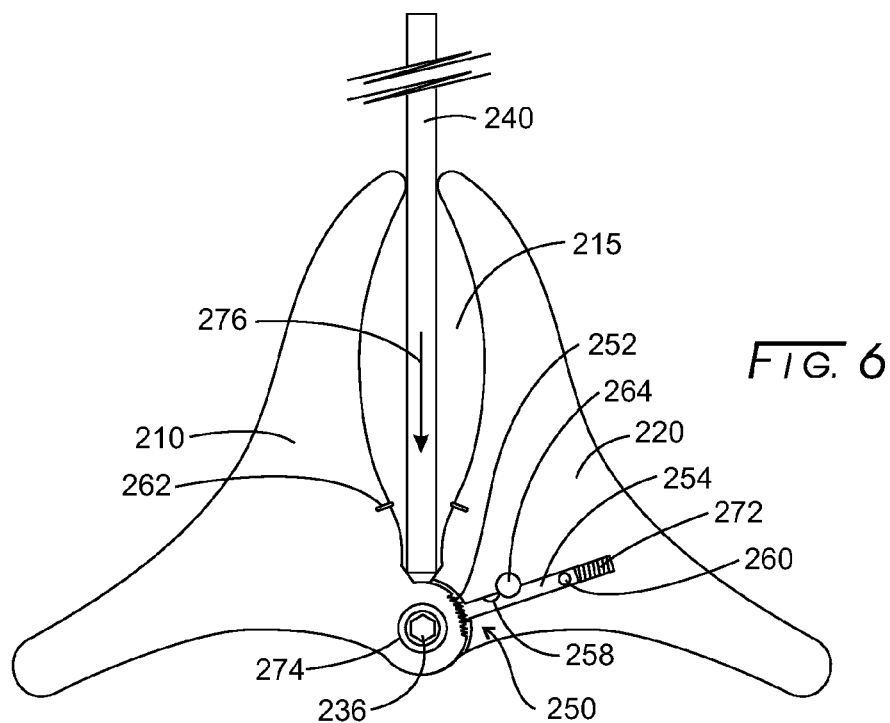
FIG. 6 is an end view of the weight-actuated panel holder assembly of FIG. 5, wherein the panel is shown being inserted into the holder assembly such that the holder assembly is displaced towards its closed position.
Figure 7:
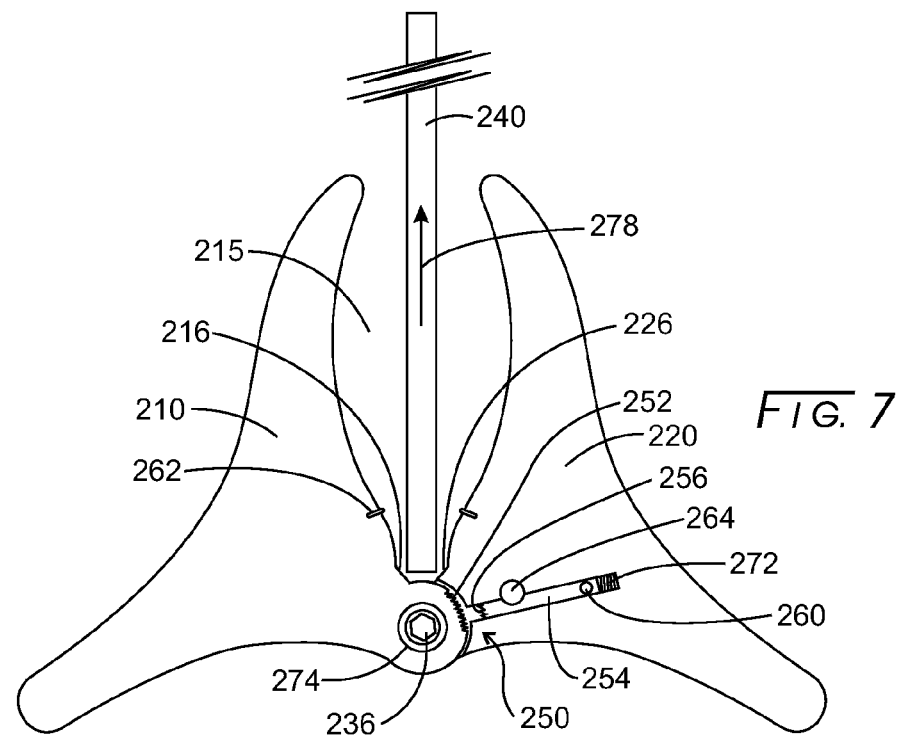
FIG. 7 is another end view of the weight-actuated panel holder assembly of FIG. 5, wherein the holder assembly is illustrated in its open position, and wherein the panel is shown being removed from the holder assembly.

Turning to FIGS. 6 and 7, it can be seen that each of the panel holder devices generally includes a first jaw member 210, a second jaw member 220 pivotally coupled to the first jaw member 210, the first and second jaw members 210, 220 cooperating to a form a slot 215 for receiving an end portion of a panel 240; and at least one clutch/ratchet mechanism 250 (or biasing mechanism) coupled to the first and second jaw members 210, 220 of the panel holder device, the clutch mechanism 250 configured to bias the first and second jaw members 210, 220 in a closed position. In the second illustrative embodiment, the weight-actuated panel holder assembly 200 is provided with a ratchet-type clutch mechanism 250, rather than the knob-type clutch mechanism 130 described above in conjunction with the first embodiment. As shown in FIG. 6, when a panel 240 is inserted into the weight-actuated panel holder assembly 200 (as diagrammatically represented by the insertion directional arrow 276 in FIG. 6), an opening width of the slot 215 is reduced by a weight of the panel 240 actuating the first and second jaw members 210, 220 from the open position of FIG. 7 to the closed position of FIG. 6 (i.e., the weight of the panel 240 applies a downward vertical force against the top of the pivotal hinge between the first and second jaw members 210, 220, which in turn, results in the respective tip portions of the first and second jaw members 210, 220 rotating towards one another until the panel holder devices of the weight-actuated panel holder assembly 200 are in the closed position illustrated in FIG. 6). In FIG. 7, the panel 240 is shown being removed from the panel holder assembly 200 (as diagrammatically represented by the removal directional arrow 278 in FIG. 7), wherein the first and second jaw members 210, 220 are disposed in their open position.

Now, with reference to FIG. 8, it can be seen that the respective tip portions of the first and second jaw members 210, 220 may be provided with respective pin-type projections 214, 224 extending from the inside surfaces thereof, and into the slot 215. In an exemplary embodiment, the pin-type projections 214, 224 may be formed from a suitable plastic material or rubber material (e.g., in order to not mark, indent, or damage the surface of the panel 240). Advantageously, the pin-type projections 214, 224 enhance the retention of the panel 240 within the slot 215 of each panel holder device by engaging the opposed sides of the panel 240 (i.e., by applying a compressive force against the opposed sides of the panel 240).

Similar to that described above with regard to the first embodiment, the first and second jaw members 210, 220 of each panel holder device of the weight-actuated panel holder assembly 200 are provided with respective panel receiving notches 216, 226 formed therein for accommodating the bottom edge portion of the panel 240 (refer to FIG. 7). As shown in the illustrative embodiment, each of the panel receiving notches 216, 226 may comprise a diagonal surface (e.g., oriented at approximately a 45 degree angle) that is disposed above the pivotal hinge portion of the panel holder device.

Next, with reference primarily to FIG. 8, the pivotal hinge portions of the panel holder devices of the weight-actuated panel holder assembly 200 will be described. Similar to the first embodiment explained above, in the second illustrative embodiment, the first and second jaw members 210, 220 of each panel holder device are provided with respective reduced width portions 212, 222, which overlap one another so as to form an overlapping hinge portion. Each reduced width portion 212, 222 has a width or thickness that is approximately equal to one-half of the width or thickness of the remaining portion of the first and second jaw members 210, 220 so that the hinge portion of each panel holder device has generally the same width or thickness as the remainder of the first and second jaw members 210, 220. A respective hinge recess is formed in the hinge portion of the first and second jaw members 210, 220, which results in the respective reduced width portions 212, 222. In FIGS. 6-9, it can be seen that the hinge recess of first jaw member 210 receives the reduced width portion 222 of the second jaw member 220 therein, while the hinge recess of second jaw member 220 receives the reduced width portion 212 of the first jaw member 210 therein, thereby resulting in a hinge portion that has generally the same width or thickness as the remainder of the first and second jaw members 110, 120. As mentioned above, when a downward vertical force is applied to the top of the pivotal hinge portion, the first and second jaw members 210, 220 rotate about a pivotal axis disposed through the center of the circular apertures in the reduced width portions 212, 222. In order to reduce friction, and thus, to allow the first and second jaw members 210, 220 to more freely rotate relative to one another, a semi-circular clearance gap 227 is provided between the first and second jaw members 210, 220 at the hinge portion of the panel holder device (e.g., a semi-circular clearance gap 227 is disposed between the semi-circular outer edge of the reduced width portion 212 of the first jaw member 210 and the semi-circular inner wall of the hinge recess of the second jaw member 220—see FIG. 8).

In the second illustrative embodiment, unlike the first embodiment, each of the first and second jaw members 210, 220 is formed from an opaque material that is generally nontransparent to visible light. In an exemplary embodiment, the opaque material that forms the first and second jaw members 210, 220 in the second illustrative embodiment may comprise a suitable metallic material (e.g., aluminum) or a nontransparent plastic material or a nontransparent polymeric material.

Next, referring primarily to FIGS. 6, 7, and 9, the clutch or biasing mechanism 250 of the second illustrative embodiment of the weight-actuated panel holder assembly 200 will be described. As shown in these figures, the clutch or biasing mechanism 250 of the second embodiment is in the form of a ratchet mechanism, which generally includes a toothed sector 252 disposed on one of the first and second jaw members 210, 220 (e.g., on the reduced width portion of the first jaw member 210) and a pawl member 254 received within a cavity or slot in the other one of the first and second jaw members 210, 220 (e.g., in the second jaw member 220). As best shown in the enlarged detail view of FIG. 9, the pawl member 254 includes a plurality of teeth 256 disposed at a distal end thereof that are configured to matingly engage with one or more teeth of the toothed sector 252 of the ratchet mechanism so as to enable the opening width of the slot 215 to be incrementally adjustable (i.e., when the first jaw member 210 with the toothed sector 252 is rotated relative to the pawl member 254), and the first and second jaw members 210, 220 to be biased in the closed position (i.e., the position illustrated in FIG. 6). The engagement between the one or more teeth of the toothed sector 252 and the one or more teeth 256 of pawl member 254 allows the first and second jaw members 210, 220 to "click" into place at a plurality of discrete opening widths of the slot 215. Also, when the one or more teeth of the toothed sector 252 are engaged with the one or more teeth 256 of pawl member 254, the clutch mechanism 250 biases the first and second jaw members 210, 220 in the closed position such that the panel 240 can be lifted without disengaging the panel 240 from the weight-actuated panel holder assembly 200. In other words, similar to that described above for the first embodiment, the clutch or biasing mechanism 250 of the second embodiment maintains the first and second jaw members 210, 220 in the closed position so that the panel 240 and the weight-actuated panel holder assembly 200 can be lifted up together by a user thereof (e.g., so that the location of the panel 240 can be changed without disengaging the panel holder assembly 200 from the panel 240). Advantageously, the clutch or biasing mechanism 250 of the illustrated embodiment may be operated by a user of the weight-actuated panel holder assembly 200 without the use of any tools (e.g., no wrenches or screwdrivers are needed for engaging and disengaging the clutch mechanism 250).

With reference to FIGS. 6-11, the pawl locking mechanism 264 of the clutch or biasing mechanism 250 will now be described. The pawl locking mechanism 264 selectively retains the pawl member 254 in a retracted position whereby the teeth 256 at the distal end of the pawl member 254 are disengaged from the teeth of the toothed sector 252 so that the panel 240 is capable of being more easily removed from the slot 215 of the first and second jaw members 210, 220. Referring to the partial sectional views of FIGS. 10 and 11, it can be seen that the pawl locking mechanism 264 comprises a first cylindrical member 266, a second cylindrical member 268, and a spring member 270 disposed around the first cylindrical member 266. Also, as shown in FIGS. 6, 7, and 9-11, the pawl member 254 includes a handle rod 260 extending outwardly therefrom, and a semi-circular engagement notch or keyway 258 for receiving a cross-sectional portion of the second cylindrical member 268 of the pawl locking mechanism 264 therein (see FIG. 10). When the pawl locking mechanism 264 is in the locked position of FIGS. 7 and 10, the pawl member 254 is in the retracted position whereby the teeth 256 at the distal end of the pawl member 254 are disengaged from the teeth of the toothed sector 252. Conversely, when the pawl locking mechanism 264 is in the unlocked position of FIGS. 6 and 11, the pawl member 254 is in the engaged position whereby the teeth 256 at the distal end of the pawl member 254 are matingly engaged with the teeth of the toothed sector 252.

In order to move the pawl member 254 into its retracted position (i.e., the FIG. 7 position), a user grasps the handle rod 260 of the pawl member 254, and axially displaces the pawl member 254 away from the hinge portion of the panel holder device until the second cylindrical member 268 of the pawl locking mechanism 264 snaps into place within the semi-circular engagement notch or keyway 258 in the side of the pawl member 254 (see FIG. 10). The spring member 270 of the pawl locking mechanism 264 applies a pushing force against the peripheral rim of the first cylindrical member 266, which in turn, axially displaces the second cylindrical member 268 of the pawl locking mechanism 264 until the second cylindrical member 268 snaps into place within the semi-circular engagement notch or keyway 258 of the pawl member 254. Because the first and second cylindrical members 266, 268 are connected to one another by a rod member (see FIGS. 10 and 11), they are axially displaced together by the spring force exerted thereon by the spring member 270. Also, when the pawl member 254 is axially displaced away from the hinge portion of the panel holder device towards its disengaged position, the pawl biasing spring 272, which is disposed at the proximal end of the pawl member 254, is compressed (see FIGS. 7 and 9). Conversely, in order to move the pawl member 254 into its engaged position (i.e., the FIG. 6 position), a user applies a compressive force against the front surface of first cylindrical member 266 of the pawl locking mechanism 264 (i.e., pushes against the front surface of first cylindrical member 266), which in turn, compresses the spring 270 and disengages the second cylindrical member 268 from the semi-circular engagement notch or keyway 258 in the side of the pawl member 254 (see FIG. 11). After the second cylindrical member 268 of the pawl locking mechanism 264 is disengaged from the semi-circular engagement notch or keyway 258 of the pawl member 254, the pawl member 254 is axially displaced towards the hinge portion of the panel holder device into its engaged position (see FIG. 6) by the pawl biasing spring 272, which applies an axial pushing force against the proximal end of the pawl member 254 so that the teeth 256 at the distal end of the pawl member 254 become engaged with the teeth of the toothed sector 252.

In the second illustrative embodiment, with reference to FIGS. 8 and 9, it can be seen that the weight-actuated panel holder assembly 200 further comprises a torsional spring member 262 on each panel holder device that is configured to bias the first and second jaw members 210, 220 of the respective panel holder device in an open position so that an end portion of the panel 240 is capable of being more easily inserted into the slot 215 defined by the first and second jaw members 210, 220. For example, as diagrammatically represented by the arrow 263 in FIG. 8, the free ends of the spring member 262 apply an outward pushing force against the first and second jaw members 210, 220 so that the first and second jaw members 210, 220 are held in their open position (i.e., the jaw members 210, 220 are biased apart). In the second embodiment, as best shown in FIG. 8, the spring member 262 is externally disposed on the first and second jaw members 210, 220. In particular, the circular body portion of each spring member 262 is wrapped around the outer circular surface of the inner elongate rod 232 (or around the outer circular surface of the outer elongate rod 230 on the opposite end of the panel holder assembly 200), and each of the free ends of the spring member 262 is wrapped around a respective one of the first and second jaw members 210, 220 (i.e., in a location above the pivotal hinge portion of the panel holder device). As shown in FIG. 8, the axially-mounted spring member 262 circumscribes the rotational axis of the first and second jaw members 210, 220, which is disposed through the center of the shaft portion 238 of the connector rod fastener member 236 in FIG. 8.

Figure 12:
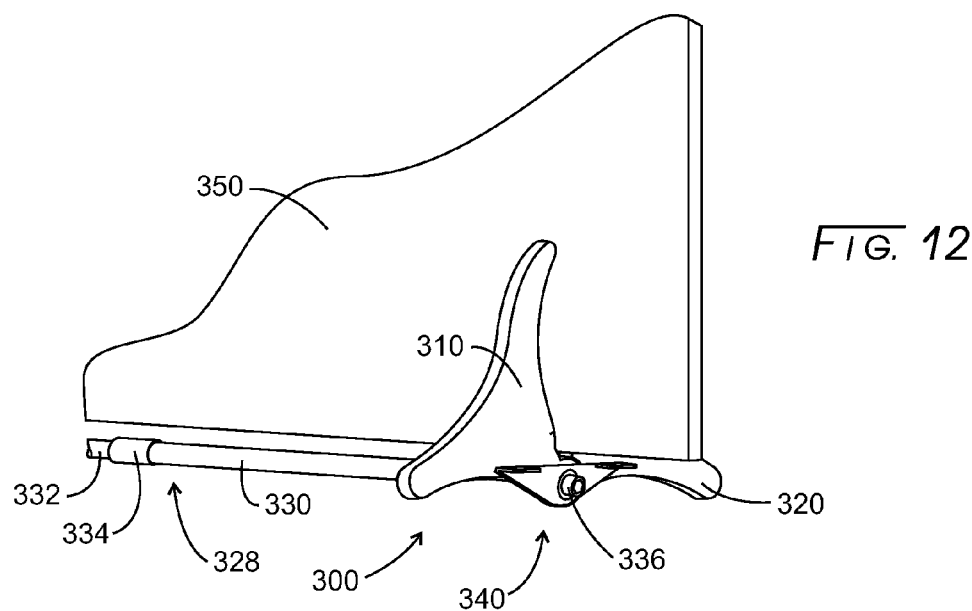
FIG. 12 is a perspective view of a weight-actuated panel holder assembly with a panel supported therein, according to a third embodiment of the invention.
Figure 13:
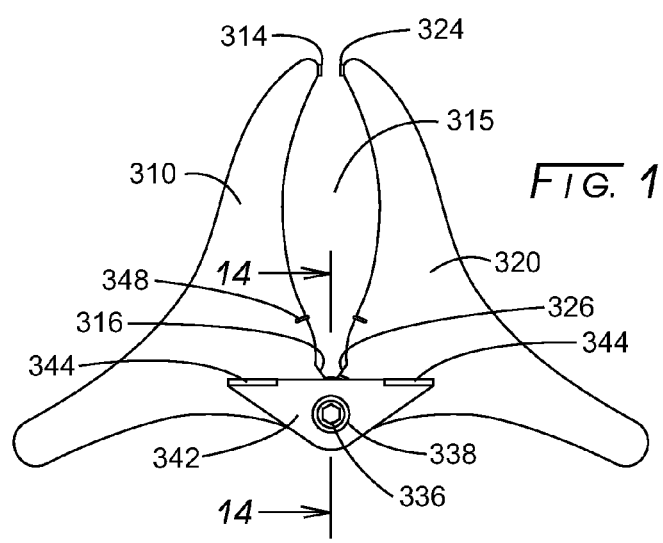
FIG. 13 is an end view of the weight-actuated panel holder assembly of FIG. 12.
Figure 14:
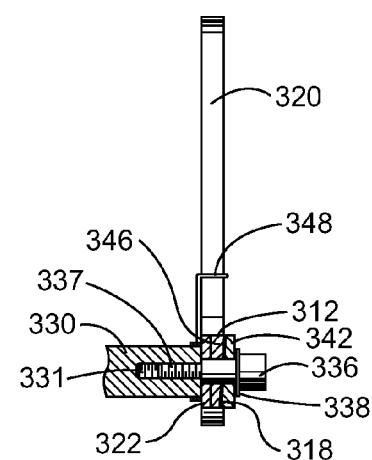
FIG. 14 is a partial sectional view of the weight-actuated panel holder assembly of FIG. 12, wherein the section is cut along the cutting-plane line 14-14 in FIG. 13.

A third illustrative embodiment of the weight-actuated panel holder assembly is seen generally at 300 in FIGS. 12-14. Referring to these figures, it can be seen that, in some respects, the third illustrative embodiment is similar to that of the first and second embodiments. Moreover, many elements are common to all of these embodiments. For the sake of brevity, the elements that the third embodiment of the weight-actuated panel holder assembly 300 has in common with the first and second embodiments will not be discussed in detail because these components have already been explained in detail above.

Similar to the first and second illustrative embodiments described above, the weight-actuated panel holder assembly 300 of the third embodiment comprises a plurality of panel holder devices (e.g., a pair of panel holder devices) that are connected to one another by means of an elongate connector device. Similar to the aforedescribed second embodiment, the elongate connector device of the third embodiment is in the form of an adjustable length connector rod 328 that is capable of accommodating panels 350 having different widths. The adjustable length connector rod 328 may connect a first one of the pair of panel holder devices to a second one of the pair of panel holder devices. Also, as shown in FIG. 12, the adjustable length connector rod 328 may comprise an inner elongate rod 332 telescopically received within an outer elongate rod 330. The longitudinal distance between a first of the pair of panel holder devices and a second of the pair of panel holder devices may be adjusted by axially displacing the inner elongate rod 332 relative to the outer elongate rod 330 so that the weight-actuated panel holder assembly 300 is capable of accommodating panels 350 of varying widths. Referring again to FIG. 12, it can be seen that, like the second embodiment, the adjustable length connector rod 328 further comprises a locking collar 334 configured to fix a position of the inner elongate rod 332 relative to the outer elongate rod 330 so that the longitudinal distance between the first of the pair of panel holder devices and the second of the pair of panel holder devices remains substantially constant. In an exemplary embodiment, the locking collar 334 may fix the axial or longitudinal position of the inner elongate rod 332 by frictionally engaging the outer peripheral surface of the inner elongate rod 332. In the third embodiment, with combined reference to FIGS. 12-14, it can be seen that the illustrated panel holder device is connected to one of the opposed ends of the adjustable length connector rod 328 by means of a connector rod fastener member 336 (e.g., a shoulder bolt or screw 336). More particularly, as shown in FIGS. 12-14, an externally threaded shaft portion 337 of the connector rod fastener member 336 is threadingly engaged with an internally threaded bore 331 in the outer end of the outer elongate rod 330. Also, as shown in the illustrative embodiment, a collar portion 338 of the head of the fastener member 336 is configured to be tightened against the front surface of a lever member 342 such that the panel holder device is securely retained on the outer elongate rod 330.

Turning to FIGS. 12 and 13, it can be seen that each of the panel holder devices of the third embodiment generally includes a first jaw member 310, a second jaw member 320 pivotally coupled to the first jaw member 310, the first and second jaw members 310, 320 cooperating to a form a slot 315 for receiving an end portion of a panel 350; and a cam-operated clutch mechanism 340 (or biasing mechanism) coupled to the first and second jaw members 310, 320 of the panel holder device, the clutch mechanism 340 configured to bias the first and second jaw members 310, 320 in a closed position. In the third illustrative embodiment, the weight-actuated panel holder assembly 300 is provided with a cam-operated clutch mechanism 340, rather than the knob-type clutch mechanism 130 of the first embodiment or the ratchet-type clutch mechanism 250 of the second embodiment. When a panel 350 is inserted into the weight-actuated panel holder assembly 300 (see FIG. 12), an opening width of the slot 315 is reduced by a weight of the panel 350 actuating the first and second jaw members 310, 320 from their open position to their closed position (i.e., the weight of the panel 350 applies a downward vertical force against the top of the pivotal hinge between the first and second jaw members 310, 320, which in turn, results in the respective tip portions of the first and second jaw members 310, 320 rotating towards one another until the panel holder devices of the weight-actuated panel holder assembly 300 are in the closed position illustrated in FIG. 12).

Now, with reference to FIG. 13, it can be seen that the respective tip portions of the first and second jaw members 310, 320 may be provided with respective tip members 314, 324 extending from the inside surfaces thereof, and into the slot 315. In an exemplary embodiment, the tip members 314, 324 may be formed from a suitable plastic material or rubber material (e.g., in order to not mark, indent, or damage the surface of the panel 350). Advantageously, the tip members 314, 324 enhance the retention of the panel 350 within the slot 315 of each panel holder device by engaging the opposed sides of the panel 350 (i.e., by applying a compressive force against the opposed sides of the panel 350). In one or more embodiments, the tip members 314, 324 may be in form of pin-type projections, such as those described above in conjunction with the second embodiment.

Similar to that described above with regard to the first and second embodiments, the first and second jaw members 310, 320 of each panel holder device of the weight-actuated panel holder assembly 300 are provided with respective panel receiving notches 316, 326 formed therein for accommodating the bottom edge portion of the panel 350 (refer to FIG. 13). As shown in the illustrative embodiment of FIG. 13, each of the panel receiving notches 316, 326 may comprise a diagonal surface (e.g., oriented at approximately a 45 degree angle) that is disposed above the pivotal hinge portion of the panel holder device.

Next, with reference primarily to the sectional view of FIG. 14, the pivotal hinge portions of the panel holder devices of the weight-actuated panel holder assembly 300 will be described. Similar to the first and second embodiments explained above, in the third illustrative embodiment, the first and second jaw members 310, 320 of each panel holder device are provided with respective reduced width portions 312, 322, which overlap one another so as to form an overlapping hinge portion. Each reduced width portion 312, 322 has a width or thickness that is less than the width or thickness of the remaining portion of the first and second jaw members 310, 320. A respective hinge recess is formed in the hinge portion of the first and second jaw members 310, 320, which results in the respective reduced width portions 312, 322. In FIG. 14, it can be seen that the hinge recess of first jaw member 310 receives the reduced width portion 322 of the second jaw member 320 therein, while the hinge recess of second jaw member 320 receives the reduced width portion 312 of the first jaw member 310 therein. Together the reduced width portions 312, 322 of the first and second jaw members 310, 320 form a hinge portion that generally has the same width or thickness as the remainder of the first and second jaw members 310, 320. In FIG. 14, it can be seen that the reduced width portion 312 of the first jaw member 310 has a width that is slightly greater than that of the reduced width portion 322 of the second jaw member 320. Also, as will be described hereinafter with regard to the cam-operated clutch mechanism 340, the reduced width portion 312 of the first jaw member 310 has a tapered surface 318 that engages with a corresponding tapered surface 346 of the lever member 342. As such, the reduced width portion 312 of the first jaw member 310 has a cross-sectional width that varies slightly across its length, while the reduced width portion 322 of the second jaw member 320 has a generally constant cross-sectional width across its length. As mentioned above, when a downward vertical force is applied to the top of the pivotal hinge portion, the first and second jaw members 310, 320 rotate about a pivotal axis disposed through the center of the circular apertures in the reduced width portions 312, 322. In order to reduce friction, and thus, to allow the first and second jaw members 310, 320 to more freely rotate relative to one another, a semi-circular clearance gap is provided between the first and second jaw members 310, 320 at the hinge portion of the panel holder device (e.g., a semi-circular clearance gap is disposed between the semi-circular outer edge of the reduced width portion 312 of the first jaw member 310 and the semi-circular inner wall of the hinge recess of the second jaw member 320).

In the third illustrative embodiment, similar to the second embodiment described above, each of the first and second jaw members 310, 320 is formed from an opaque material that is generally nontransparent to visible light. In an exemplary embodiment, the opaque material that forms the first and second jaw members 310, 320 in the third illustrative embodiment may comprise a suitable metallic material (e.g., aluminum) or a nontransparent plastic material or a nontransparent polymeric material.

Next, referring again to FIGS. 12-14, the cam-operated clutch mechanism 340 of the third illustrative embodiment of the weight-actuated panel holder assembly 300 will be described. As shown in these figures, the cam-operated clutch mechanism 340 comprises a lever member 342 that is pivotable about a central rotational axis disposed through the center of threaded shaft portion 337 of the connector rod fastener member 336. As best depicted in the sectional view of FIG. 14, the lever member 342 has a tapered inner surface 346 that is configured to engage with the tapered surface 318 of the reduced width portion 312 of the first jaw member 310. The cam-operated clutch mechanism 340 is configured to bias the first and second jaw members 310, 320 in the closed position when the tapered inner surface 346 of the lever member 342 is frictionally engaged with the tapered surface 318 of the reduced width portion 312 of the first jaw member 310. Referring to FIGS. 12 and 13, it can be seen that, in the illustrative embodiment, the lever member 342 is generally in the form of an inverted triangular-shaped plate with a pair of spaced-apart finger tabs 344 extending outwardly therefrom. Each of the finger tabs 344 is configured to facilitate a grasping of the lever member 342 by a user thereof so that the user is able to more easily rotate the lever member 342 about the shaft of the fastener 336 between its engaged and disengaged positions. When the lever member 342 is rotated by a user into its engaged position whereby the tapered inner surface 346 of the lever member 342 is frictionally engaged with the tapered surface 318 of the reduced width portion 312 of the first jaw member 310, the cam-operated clutch mechanism 340 biases the first and second jaw members 310, 320 in the closed position such that the panel 350 can be lifted without disengaging the panel 350 from the weight-actuated panel holder assembly 300. In other words, the clutch or biasing mechanism 350 maintains the first and second jaw members 310, 320 in the closed position so that the panel 350 and the weight-actuated panel holder assembly 300 can be lifted up together by a user thereof (e.g., so that the location of the panel 350 can be changed without disengaging the panel holder assembly 300 from the panel 350). Conversely, when the lever member 342 is rotated by a user into its disengaged position whereby the tapered inner surface 346 of the lever member 342 is not frictionally engaged with the tapered surface 318 of the reduced width portion 312 of the first jaw member 310, the user is able to remove the panel 350 from the jaw members 310, 320 of the panel holder device. Advantageously, the lever member 342 of the illustrated embodiment may be tightened or loosened by a user of the weight-actuated panel holder assembly 300 without the use of tools (e.g., no wrenches or screwdrivers are needed for tightening and loosening the lever member 342).

In the third illustrative embodiment, similar to the second embodiment described above, the weight-actuated panel holder assembly 300 further comprises a torsional spring member 348 on each panel holder device that is configured to bias the first and second jaw members 310, 320 of the respective panel holder device in an open position so that an end portion of the panel 350 is capable of being more easily inserted into the slot 315 defined by the first and second jaw members 310, 320 (refer to FIGS. 13 and 14). Similar to that described above in conjunction with the second embodiment, the free ends of the spring member 348 apply an outward pushing force against the first and second jaw members 310, 320 so that the first and second jaw members 310, 320 are held in their open position (i.e., the jaw members 310, 320 are biased apart). In the third embodiment, as best shown in FIGS. 13 and 14, the spring member 348 is externally disposed on the first and second jaw members 310, 320. In particular, as shown in FIG. 14, the circular body portion of the spring member 348 is wrapped around the outer circular surface of the outer elongate rod 330 (or around the outer circular surface of the inner elongate rod 332 on the opposite end of the panel holder assembly 300), and each of the free ends of the spring member 348 is wrapped around a respective one of the first and second jaw members 310, 320 (i.e., in a location above the pivotal hinge portion of the panel holder device—see FIG. 13). As shown in the figures, the axially-mounted spring member 348 circumscribes the rotational axis of the first and second jaw members 310, 320, which is disposed through the center of the shaft portion 337 of the connector rod fastener member 336 in FIG. 14.

A fourth illustrative embodiment of a plurality of weight-actuated panel holders for holding a panel 440 is seen generally at 400 in FIGS. 15-19. Referring to these figures, it can be seen that, in some respects, the fourth illustrative embodiment is similar to that of the preceding three embodiments. Moreover, many elements are common to all of these embodiments. For the sake of brevity, the elements that the fourth embodiment of the weight-actuated panel holders 400 have in common with the preceding three embodiments will not be discussed in detail because these components have already been explained in detail above.

Figure 15:
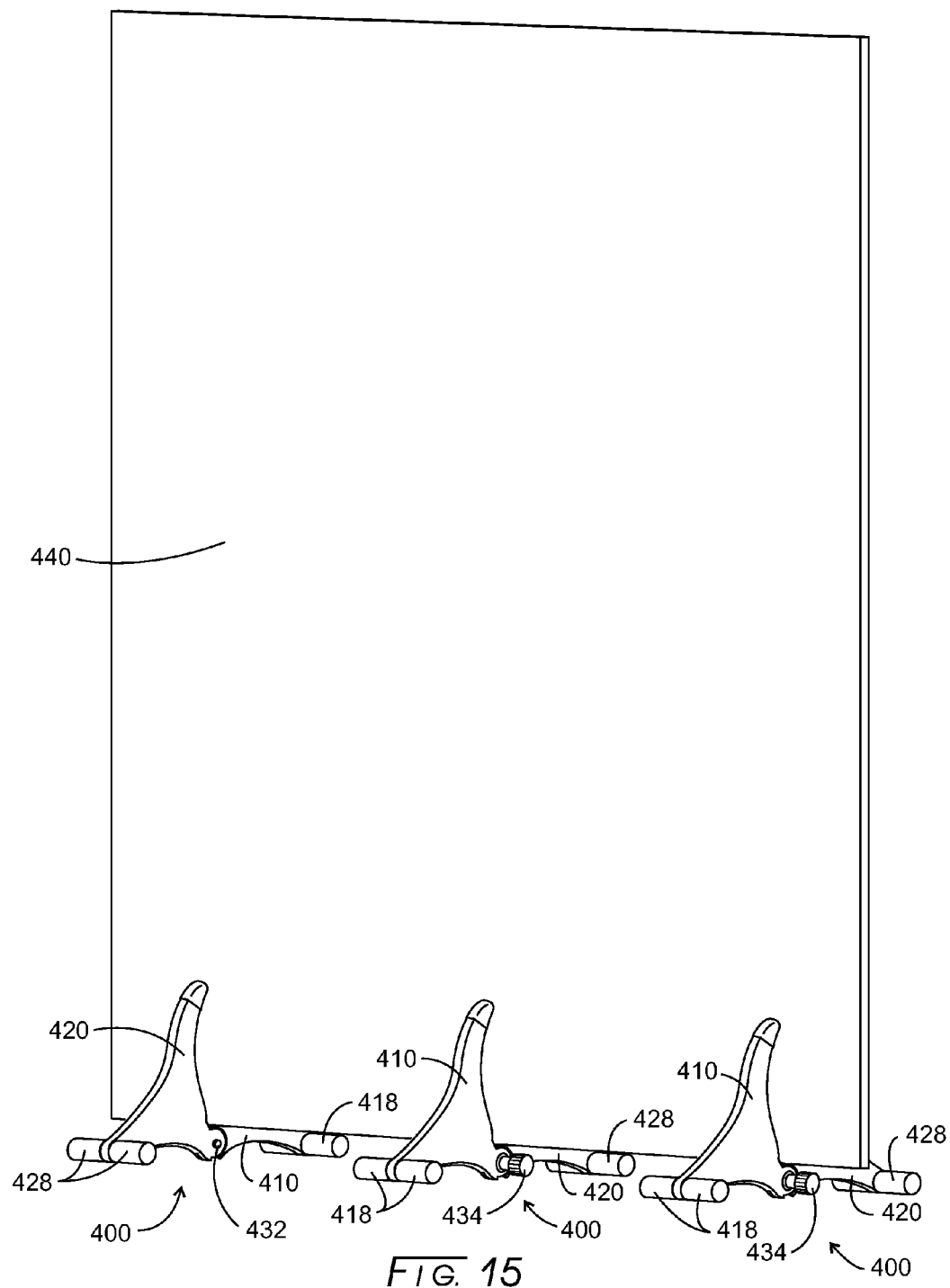
FIG. 15 is a perspective view of a plurality of spaced-apart panel holders with a panel supported thereby, according to a fourth embodiment of the invention.

In the fourth illustrative embodiment, unlike the preceding embodiments, a plurality of discrete weight-actuated panel holders 400 are provided. As shown in FIG. 15, the plurality of weight-actuated panel holders 400 are not connected together by means of an elongate connector device or rod, as described above with regard to the first three embodiments. Rather, as will be explained in more detail hereinafter, each of the weight-actuated panel holders 400 is provided with a plurality of feet 418, 428 thereon to stabilize the weight-actuated panel holders 400. In FIG. 15, it can be seen that a panel 440 is supported in an upright position by a plurality of weight-actuated panel holders 400 spaced-apart along a bottom edge portion thereof.

Turning to FIGS. 16 and 17, it can be seen that each of the weight-actuated panel holders 400 generally includes a first jaw member 410, a second jaw member 420 pivotally coupled to the first jaw member 410, the first and second jaw members 410, 420 cooperating to a form a slot 415 for receiving an end portion of a panel 440; and at least one clutch mechanism 430 (or biasing mechanism—see FIG. 18) coupled to the first and second jaw members 410, 420 of the panel holder 400, the clutch mechanism 430 configured to bias the first and second jaw members 410, 420 in a closed position. As shown in FIGS. 16 and 17, when a panel 440 is inserted into each weight-actuated panel holder 400 (as diagrammatically represented by the insertion directional arrow 450 in FIG. 16), an opening width of the slot 415 is reduced by a weight of the panel 440 actuating the first and second jaw members 410, 420 from the open position of FIG. 16 to the closed position of FIG. 17 (i.e., the weight of the panel 440 applies a downward vertical force against the top of the pivotal hinge between the first and second jaw members 410, 420, which in turn, results in the respective tip portions of the first and second jaw members 410, 420 rotating towards one another until the weight-actuated panel holders 400 are in the closed position illustrated in FIG. 17).

Referring again to FIGS. 16 and 17, it can be seen that the respective tip portions of the first and second jaw members 410, 420 may be provided with respective tip covers 414, 424 disposed thereon. In an exemplary embodiment, the tip covers 414, 424 may be formed from a suitable rubber material (i.e., which is relatively soft and compressible). Advantageously, the tip covers 414, 424 increase a frictional contact between the panel 440 and a respective one of the first and second tip portions so as to retain the panel 440 within each weight-actuated panel holder 400 when the panel 440 is lifted from a surface on which it rests. In addition, the tip covers 414, 424 advantageously protect a surface of the panel 440 from damage by the first and second tip portions of the first and second jaw members 410, 420 (i.e., from being scratched by the tip portions, etc.). Thus, the surface finish of the panel 440 is protected from damage thereto.

In addition, as best shown in the illustrative embodiment of FIGS. 15-17 and 19, the respective base portions 410*a*, 420*a* of the first and second jaw members 410, 420 are provided with respective foot portions 418, 428 attached thereto. More particularly, as depicted in FIGS. 15 and 18, the base portion 410*a* of the first jaw member 410 is provided with cylindrical foot portions 418 attached to opposed sides thereof (i.e., a circular end of each foot portion 418 is mounted to one of the opposed sides of the base portion 410*a*), and the base portion 420*a* of the second jaw member 420 is provided with cylindrical foot portions 428 attached to opposed sides thereof (i.e., a circular end of each foot portion 428 is mounted to one of the opposed sides of the base portion 420*a*). The feet portions 418, 428 on the base portions 410*a*, 420*a* of the first and second jaw members 410, 420 of each weight-actuated panel holder 400 are configured to stabilize each of the panel holders 400 in an upright position.

Similar to that described above with regard to the first three embodiments, the first and second jaw members 410, 420 of each weight-actuated panel holder 400 are provided with respective panel receiving notches 416, 426 formed therein for accommodating the bottom edge portion of the panel 440 (refer to FIG. 16). As shown in the illustrative embodiment of FIG. 16, each of the panel receiving notches 416, 426 may comprise a diagonal surface (e.g., oriented at approximately a 45 degree angle) that is disposed above the pivotal hinge portion of the panel holder 400.

Next, with reference primarily to FIGS. 16-19, the pivotal hinge portions of each weight-actuated panel holder 400 will be described. Similar to the first three embodiments explained above, in the fourth illustrative embodiment, the first and second jaw members 410, 420 of each panel holder 400 are provided with respective reduced width portions 412, 422, which overlap one another so as to form an overlapping hinge portion. Each reduced width portion 412, 422 has a width or thickness that is approximately equal to one-half of the width or thickness of the remaining portion of the first and second jaw members 410, 420 so that the hinge portion of each panel holder 400 has generally the same width or thickness as the remainder of the first and second jaw members 410, 420. A respective hinge recess is formed in the hinge portion of the first and second jaw members 410, 420, which results in the respective reduced width portions 412, 422. As best shown in the sectional view of FIG. 18, it can be seen that the hinge recess of first jaw member 410 receives the reduced width portion 422 of the second jaw member 420 therein, while the hinge recess of second jaw member 420 receives the reduced width portion 412 of the first jaw member 410 therein, thereby resulting in a hinge portion that has generally the same width or thickness as the remainder of the first and second jaw members 410, 420. As mentioned above, when a downward vertical force is applied to the top of the pivotal hinge portion, the first and second jaw members 410, 420 rotate about a pivotal axis disposed through the center of the circular apertures in the reduced width portions 412, 422. In order to reduce friction, and thus, to allow the first and second jaw members 410, 420 to more freely rotate relative to one another, a semi-circular clearance gap 436 is provided between the first and second jaw members 410, 420 at the hinge portion of the panel holder device (i.e., a semi-circular clearance gap 436 is disposed between the semi-circular outer edge of the reduced width portion 412 of the first jaw member 410 and the semi-circular inner wall of the hinge recess of the second jaw member 420—see FIG. 16). Also, as shown in FIGS. 16, 17, and 19, the first and second jaw members 410, 420 are each provided with a respective rotation limiting stop member 417, 427. In FIGS. 16, 17, and 19, it can be seen that each rotation limiting stop member 417, 427 is in the form of abutment that is configured to prevent the first and second jaw members 410, 420 from being opened beyond a predetermined maximum angular displacement position (i.e., the maximum opening position in which the rotation limiting stop members 417, 427 contact one another—refer to the FIG. 16 position). The rotation limiting stop members 417, 427 limit the rotational travel of each of the first and second jaw members 410, 420 such that the slot 415 cannot be opened beyond a predetermined maximum width.

In the fourth illustrative embodiment, similar to the second and third embodiments described above, each of the first and second jaw members 410, 420 is formed from an opaque material that is generally nontransparent to visible light. In an exemplary embodiment, the opaque material that forms the first and second jaw members 410, 420 in the fourth illustrative embodiment may comprise a suitable metallic material (e.g., aluminum) or a nontransparent plastic material or a nontransparent polymeric material.

In the fourth illustrative embodiment, similar to that described above in conjunction with the first embodiment, each of the weight-actuated panel holders 400 is provided with a knob-type clutch mechanism 430. As shown in the sectional view of FIG. 18, the clutch or biasing mechanism 430 comprises a threaded rod portion 432 and a knob or handle portion 434 attached to one end of the threaded rod portion 432. When the knob or handle portion 434 is tightened against a side of the reduced width portion 412 of the first jaw member 410 by a user rotating the knob 434 in a first rotational direction (i.e., clockwise), the clutch mechanism 430 biases the first and second jaw members 410, 420 in the closed position such that the panel 440 can be lifted (as diagrammatically indicated by the arrow 452 in FIG. 17) without disengaging the panel 440 from the weight-actuated panel holder 400. In other words, the clutch or biasing mechanism 430 maintains the first and second jaw members 410, 420 in the closed position so that the panel 440 and the weight-actuated panel holder 400 can be lifted up together by a user thereof (e.g., so that the location of the panel 440 can be changed without disengaging the panel holder 400 from the panel 440). In order to loosen the grip of the first and second jaw members 410, 420 on the panel 440, a user rotates the knob 434 in a second rotational direction that is opposite to the first rotational direction (i.e., counter-clockwise). Advantageously, the handle portion 434 of the illustrated embodiment may be tightened or loosened by a user of the weight-actuated panel holder 400 without the use of tools (e.g., no wrenches or screwdrivers are needed for tightening and loosening the handle portion 434). As shown in the illustrated embodiment, the outer peripheral surface of the handle portion 434 may be knurled so as to enhance the grip of a user on knob 434.

Referring again to the sectional view of FIG. 18, it can be seen that, in the fourth illustrative embodiment, the threaded rod portion 432 of the clutch mechanism 430 is threadingly engaged with an internally-threaded aperture that is formed in the reduced width portion 422 of the second jaw member 420. Also, in the illustrative embodiment, a washer 438 is provided between the rear surface of the knob or handle portion 434 of the clutch mechanism 430 and the front surface of the reduced width portion 412 of the first jaw member 410. When the knob or handle portion 434 of the clutch mechanism 430 is tightened, the knob portion 434 of the clutch mechanism 430 compresses the opposed surfaces of the reduced width portions 412, 422 against one another, thereby creating a frictional engagement between the reduced width portions 412, 422 so as to prevent the rotational movement of the first and second jaw members 410, 420 relative to one another. As such, the first and second jaw members 410, 420 of the panel holder 400 are maintained in gripping contact with the panel 440.

In the fourth illustrative embodiment, similar to the second and third embodiments described above, the weight-actuated panel holder 400 further comprises a torsional spring member 442 that is configured to bias the first and second jaw members 410, 420 of the panel holder 400 in an open position so that an end portion of the panel 440 is capable of being more easily inserted into the slot 415 defined by the first and second jaw members 410, 420 (refer to FIG. 16). Similar to that described above in conjunction with the second and third embodiments, the opposed arms 444 of the spring member 442 (i.e., the free end portions 444 of the torsional spring 442) apply a biasing torque on the first and second jaw members 410, 420 so that the first and second jaw members 410, 420 are held in their open position (i.e., the jaw members 410, 420 are biased apart—refer to FIG. 16 position). However, in the fourth embodiment, unlike in the second and third embodiments, the torsional spring member 442 is internally disposed within the first and second jaw members 410, 420. More particularly, as shown in the illustrative embodiment of FIGS. 18 and 19, the reduced width portion 412 of the first jaw member 410 comprises a central spring cavity 448 formed therein for receiving the cylindrical body portion of the spring 442 and a notch 446, which is connected to the central spring cavity 448, formed therein for receiving one of the opposed arms 444 of the spring member 442. With reference to FIGS. 18 and 19, it can be seen that the central spring cavity 448 is in the form of a cylindrical bore in the reduced width portion 412 of the first jaw member 410, and that the notch 446 is in the form of a sectorial notch that extends from the outer edge of the reduced width portion 412 to the cylindrical spring cavity 448. Referring again to FIGS. 18 and 19, it can be seen that the torsional spring member 442 of the fourth embodiment is internally disposed within the spring cavity 448 and the notch 446 so that the spring 442 is concealed with the first and second jaw members 410, 420 of the panel holder 400. Similar to the second and third embodiments described above, as shown in FIGS. 18 and 19, the circular body portion of the axially-mounted spring member 442 circumscribes the rotational axis of the first and second jaw members 410, 420, which is disposed through the center of the threaded rod portion 432 of the clutch or biasing mechanism 430.

It is readily apparent that the aforedescribed weight-actuated panel holders and panel holder assemblies including the same 100, 200, 300, 400 offers numerous advantages. First, the weight-actuated panel holders and holder assemblies including the same allow a panel to be quickly and easily supported in a vertical or upright position without requiring the use of tools. The self-clamping design of the weight-actuated panel holders obviate the need for a user to manually engage the panel holders with the panel being supported thereby. Secondly, the abovedescribed weight-actuated panel holders and holder assemblies do not require any readjustment when the sign or panel that is being held thereby is moved to another location by a user. Thirdly, the weight-actuated panel holders and holder assemblies are capable of accommodating a wide variety of different panel sizes. As such, the weight-actuated panel holders and holder assemblies described herein offer a scalable solution for holding panels having a myriad of different widths and thicknesses. Finally, the weight-actuated panel holders and holder assemblies do not require a user to manually center the panel when it is initially being inserted into the holder or holder assembly. In particular, the weight-actuated panel holders and holder assemblies described above incorporate a self-centering design that holds panels straight and true without requiring any significant amount of time from the user to adjust the position of the panel.

In addition to the advantages described above, the aforedescribed weight-actuated panel holders and panel holder assemblies including the same 100, 200, 300, 400 also do not require the supported panel to be modified in any way in order to be secured within the holder device (e.g., no holes are required to be drilled through the panel). Also, when the clutch mechanisms described above are in their engaged positions, the panels being supported can be moved to another location without disengaging the panels from their holder devices (i.e., the holder device(s) remain securely attached to the panel being held). In addition, the aforedescribed weight-actuated panel holders are designed to support a panel in an upright position without damaging the panel in any way (i.e., the panel holders do not scratch or mar the surface of the panel being supported thereby). Moreover, the weight-actuated panel holders and panel holder assemblies described herein stably maintain the panel in a vertical or upright position without undesirable movement of the panel within the holder. Furthermore, as described above in the second, third, and forth embodiments, the weight-actuated panel holders may incorporate a spring-loaded release mechanism so that the panel is capable of being more easily removed from the panel holder devices. This spring-assist feature, as explained in the second, third, and forth embodiments, allows the easy removal of the panel from the panel holder devices because the panel holder devices essentially "self-open".

It is to be understood that the aforedescribed weight-actuated panel holders and panel holder assemblies including the same 100, 200, 300, 400 can be used in many different applications. As one example, the panel holder devices described above may be used to support display signs on the top surfaces of tabletops or cabinetry. As another example, the panel holder devices described herein may be used to support rigid panel workpieces in upright or vertical positions (e.g., wall panels, door panels, etc.).

Any of the features or attributes of the above described embodiments and variations can be used in combination with any of the other features and attributes of the above described embodiments and variations as desired.

Although the invention has been shown and described with respect to a certain embodiment or embodiments, it is apparent that this invention can be embodied in many different forms and that many other modifications and variations are possible without departing from the spirit and scope of this invention.

Moreover, while exemplary embodiments have been described herein, one of ordinary skill in the art will readily appreciate that the exemplary embodiments set forth above are merely illustrative in nature and should not be construed as to limit the claims in any manner. Rather, the scope of the invention is defined only by the appended claims and their equivalents, and not, by the preceding description.

The invention claimed is:

1. A weight-actuated panel holder, comprising:
a first jaw member, said first jaw member including a first base portion with a first foot portion;
a second jaw member pivotally coupled to said first jaw member, said second jaw member including a second base portion with a second foot portion, said first and second jaw members cooperating to a form a slot for receiving an end portion of a panel, an opening width of at least a portion of said slot being configured to be reduced when a weight of said panel actuates said first and second jaw members towards a closed position, and said first and second foot portions of said first and second jaw members being configured to be displaced outwardly away from each other as said first and second jaw members move towards said closed position so that a spacing distance between said first and second foot portions is increased, thereby stabilizing said panel in an upright stationary position on a surface on which it rests; and
a clutch mechanism coupled to at least one of said first and second jaw members, said clutch mechanism configured to bias said at least one of said first and second jaw members in said closed position.

2. The weight-actuated panel holder according to claim 1, wherein at least one of said first and second jaw members is generally transparent to visible light.

3. The weight-actuated panel holder according to claim 1, wherein said first jaw member further comprises a first tip portion and said second jaw member further comprises a second tip portion, at least one of said first and second tip portions comprising a tip cover disposed thereon, said tip cover configured to increase a frictional contact between said panel and said at least one of said first and second tip portions so as to retain said panel within said weight-actuated panel holder when said panel is lifted from said surface on which it rests, and said tip cover further configured to protect a surface of said panel from damage by said at least one of said first and second tip portions.

4. The weight-actuated panel holder according to claim 1, wherein said clutch mechanism comprises a threaded rod portion and a knob portion attached to one end of said threaded rod portion, said clutch mechanism configured to bias said at least one of said first and second jaw members in said closed position when said knob portion is tightened against a side of one of said first and second jaw members.

5. The weight-actuated panel holder according to claim 1, wherein said clutch mechanism comprises a ratchet mechanism, said ratchet mechanism including a toothed sector disposed on one of said first and second jaw members, said ratchet mechanism further including a pawl member received within a cavity or slot in the other one of said first and second jaw members, said pawl member including one or more teeth disposed at one end thereof that are configured to matingly engage with one or more teeth of said toothed sector of said ratchet mechanism so as to enable said opening width of said slot to be incrementally adjustable, and said at least one of said first and second jaw members to be biased in said closed position.

6. The weight-actuated panel holder according to claim 5, further comprising a pawl locking mechanism, said pawl locking mechanism configured to selectively retain said pawl member in a retracted position whereby said one or more teeth at said one end of said pawl member are disengaged from said one or more teeth of said toothed sector so that said panel is capable of being more easily removed from said slot defined by said first and second jaw members.

7. The weight-actuated panel holder according to claim 1, wherein said clutch mechanism comprises a cam-operated clutch mechanism, said cam-operated clutch mechanism comprising a lever member that is pivotable about a rotational axis, said lever member having a tapered inner surface, said cam-operated clutch mechanism configured to bias said at least one of said first and second jaw members in said closed position when said tapered inner surface of said lever member is frictionally engaged with a tapered inner surface of one of said first and second jaw members.

8. The weight-actuated panel holder according to claim 7, wherein said lever member of said cam-operated clutch mechanism comprises one or more finger tabs extending outwardly therefrom, said one or more finger tabs configured to facilitate a grasping of said lever member by said user thereof.

9. The weight-actuated panel holder according to claim 1, further comprising a spring member configured to bias at least one of said first and second jaw members in an open position so that said end portion of said panel is capable of being more easily inserted into said slot defined by said first and second jaw members.

10. The weight-actuated panel holder according to claim 9, wherein said spring member is externally disposed on said first and second jaw members.

11. The weight-actuated panel holder according to claim 9, wherein at least one of said first and second jaw members comprises a spring cavity formed therein, said spring member being internally disposed within said spring cavity.

12. The weight-actuated panel holder according to claim 1, wherein at least one of said first and second jaw members comprises a rotation limiting stop portion, said rotation limiting stop portion configured to prevent said first and second jaw members from being opened beyond a maximum angular displacement position.

13. A weight-actuated panel holder assembly, comprising:
a plurality of panel holder devices, each of said plurality of panel holder devices including:
  a first jaw member; and
  a second jaw member pivotally coupled to said first jaw member, said first and second jaw members cooperating to a form a slot for receiving an end portion of a panel, an opening width of at least a portion of said slot being configured to be reduced when a weight of said panel actuates said first and second jaw members towards a closed position;
at least one clutch mechanism coupled to at least one of said first and second jaw members of at least one of said plurality of panel holder devices, said clutch mechanism configured to bias at least one of said first and second jaw members in said closed position; and
an elongate connector device connecting a first of said plurality of panel holder devices to a second of said plurality of panel holder devices.

14. The weight-actuated panel holder assembly according to claim 13, wherein said elongate connector device is in the form of a rod member having a fixed length.

15. The weight-actuated panel holder assembly according to claim 13, wherein said elongate connector device comprises an inner elongate member telescopically received within an outer elongate member, wherein a longitudinal distance between said first of said plurality of panel holder devices and said second of said plurality of panel holder devices is configured to be adjusted by displacing said inner elongate member relative to said outer elongate member so that said weight-actuated panel holder assembly is capable of accommodating panels of varying widths.

16. The weight-actuated panel holder assembly according to claim 15, wherein said elongate connector device further comprises a locking collar configured to fix a position of said inner elongate member relative to said outer elongate member so that said longitudinal distance between said first of said plurality of panel holder devices and said second of said plurality of panel holder devices remains substantially constant.

17. A weight-actuated panel holder, comprising:
a first jaw member;
a second jaw member pivotally coupled to said first jaw member about a rotational axis, said first and second jaw members cooperating to a form a slot for receiving an end portion of a panel, an opening width of at least a portion of said slot being configured to be reduced when a weight of said panel actuates said first and second jaw members towards a closed position;
a spring member configured to bias at least one of said first and second jaw members in an open position so that said end portion of said panel is capable of being more easily inserted into said slot defined by said first and second jaw members; and
a clutch mechanism coupled to at least one of said first and second jaw members, said clutch mechanism configured to bias at least one of said first and second jaw members in said closed position, and said clutch mechanism configured to maintain said first and second jaw members in said closed position so that said panel and said weight-actuated panel holder are capable of being lifted up together by a user thereof without said panel becoming disengaged from said weight-actuated panel holder.

18. The weight-actuated panel holder according to claim 17, wherein said spring member at least partially circumscribes said rotational axis of said first and second jaw members.

19. The weight-actuated panel holder according to claim 17, wherein each of said first and second jaw members comprises a tip portion with a tip contact surface and a foot portion with a foot contact surface, said tip contact surface of said tip portion being disposed at an obtuse angle relative to said foot contact surface of said foot portion.

20. The weight-actuated panel holder according to claim 17, wherein a lower portion of said first jaw member overlaps a lower portion of said second jaw member so as to form an overlapping hinge portion of said weight-actuated panel holder, said rotational axis of said first and second jaw members being centrally disposed through said overlapping hinge portion.

* * * * *